Patented June 7, 1938

2,120,015

UNITED STATES PATENT OFFICE 2,120,015

ROSIN REFINING AND POLYMERIZATION SIMULTANEOUSLY

Joseph N. Borglin, Wilmington, Del., assignor to Hercules Powder Company, Wilmington, Del., a corporation of Delaware No Drawing. Application December 31, 1935, Serial No. 57,064

12 Claims. (Cl. 87—2)

This invention relates to a process of purifying rosin, particularly wood rosin and the lower grades of gum rosin.

As is well known, wood rosin and the lower grades of gum rosin cannot be used for many industrial purposes without a refining treatment. This unsuitability is caused by the presence of color bodies, especially latent color bodies. Latent color bodies may be present in a rosin freed from visible color bodies and will cause darkening on aging of the rosin or compositions containing it, such, for example, as soaps in which latent color bodies darken due to the presence of alkali. The unrefined rosin is especially unsuitable for use in making rosin soaps, since the soap produced from an unrefined wood rosin or low grade gum rosin, even if initially light in color, will discolor on aging and assume a curious banded appearance and/or be of unsatisfactory color.

Various processes of refining rosin by the removal of color bodies therefrom are known, as, for example, treatment with selective solvents, distillation under various conditions, etc. One method of refining wood rosin involves distillation of the rosin in the presence of a boron compound, such as boric acid, as is fully described in my United States Patent No. 1,849,537.

Now it has been found in accordance with this invention that the reaction product between the color bodies, both visible and latent, and a suitable boron compound such as, for example, boric acid, sodium tetraborate, boric anhydride, boron trifluoride, boron triacetate, molecular compounds of boron trifluoride, etc. is insoluble in the usual solvents for rosin, and that a purified rosin may accordingly be obtained by treating unrefined rosin with a boron compound such as, for example, boric acid, sodium tetraborate, boric anhydride, boron trifluoride, boron triacetate, molecular compounds of boron trifluoride, etc., and then removing the reaction product from the treated rosin by filtration or by extraction with a rosin solvent, which is a non-solvent for the color body-boron compound complex.

More particularly, the method in accordance with this invention is carried out by treating the impure rosin with a suitable boron compound, for example, boric acid, at a temperature of from 100 to 225° C. for a period of from one minute to one hour. I prefer, however, to use a temperature of about 125–150° C. and to treat for not longer than fifteen minutes. The amount of boric acid or other boron compound which may be used varies from 0.01 to 10% of the amount of rosin to be refined, preferably from about 0.01 to about 3%. The treating may be conducted in air, but is preferably conducted in an inert atmosphere as, for example, under carbon dioxide or nitrogen gas. Any suitable boron compound may be used as, for example, boric anhydride, sodium tetraborate, boric acid, boron trifluoride, boron triacetate, molecular compounds of boron trifluoride, or the like. After the rosin has been treated sufficiently with the boron compound, the rosin is cooled and then dissolved in a solvent for rosin, which is a non-solvent for the color body-boron compound reaction product, for example, gasoline, petroleum ether; pinene; dipentene; benzol; toluol; hydrogenated naphtha; hydrogenated naphthalene, etc. Preferably, though not essentially, the solvent will be used in amount to form a solution containing about 14% rosin, although concentrations within the range of 5% to 50% will be found suitable.

After permitting the insoluble products of the treatment to settle, the solution is decanted or filtered and then evaporated to recover the purified rosin.

Alternatively, the rosin may be treated directly in solution in one of the solvents named above, for example, gasoline, by adding the desired quantity of a suitable boron compound, and heating the solution at a temperature of about 125–150° C. under the pressure so generated as in an autoclave for about an hour. The solution will preferably be agitated during the heating period. Following this treatment, the solution will be filtered or decanted for the removal of the insoluble reaction products.

Thus, for example, 500 parts of FF rosin solution in gasoline to give a 15% solution are treated with about 1 part of boric acid, and the solution is then heated with agitation in an autoclave at a temperature of about 150° C. for about one hour. The cooled solution is then filtered and evaporated to recover the refined resin.

The use of boron trifluoride, in accordance with this invention, not only makes possible the refining of rosin as with other boron compounds, but also makes possible the polymerization of the rosin to raise its melting point in the same treatment. The rosin produced by such simultaneous refining and polymerization with boron trifluoride, having both improved color and increased melting point, is an especially desirable product for many commercial uses. Heretofore, it has been necessary to subject rosin to two separate treatments to secure such a product, i. e., either a polymerization treatment followed by a refining treatment, or the same treatments in reversed order.

When refining of the rosin without substantial polymerization is desired, treatment with boron trifluoride will be conducted preferably below 50° C., and desirably at about 10° C. to about 30° C. The time of treatment will desirably be short, and several short treatments—about one minute each—are preferred to a single treatment of equivalent total duration.

Thus, for example, 300 parts of FF wood rosin, having a drop melting point of 79° C., dissolved in gasoline (13% concentration) are given a one minute treatment with BF₃, by passing the gas through the solution at about 22° C. The solution is then filtered and the filtrate again treated with BF₃ for one minute. The treated solution is again filtered, water washed at about 22° C., and the solvent evaporated under reduced pressure. An 85.4% yield of I+ rosin having a melting point of about 84.5° C. and an acid number of about 160 is obtained.

As a further example, 300 parts of FF wood rosin dissolved in gasoline as above are given three one-minute treatments with BF₃ as above. The solution is filtered after each treatment and finally water washed before evaporating under reduced pressure. A 63.5% yield of X+ rosin may be obtained, which has a melting point of about 85° C.

It will be seen that the time of treatment is short. The step of filtration between the separate treatments is highly important, as is the step of water washing prior to evaporation of the solvent.

In the foregoing examples the color was improved several color grades with an attendant increase of only about 5° C. in the melting point of the rosin. It is possible, however, to obtain an increase of as much as 20° C. in the melting point of the rosin, with a substantial improvement in color. If a substantial increase in melting point is desired, with improvement in color, such can be obtained by allowing the boron trifluoride to remain in contact with the rosin for a longer period of time. One long period or several shorter periods of equivalent total duration may be used. In either case the total reaction period may be as long as 24 hours. Longer reaction periods are not desirable, since they cause a darkening of the rosin and, hence, a reduction in the net refining action obtained. Thus, the total reaction period may vary from about 1 minute to about 24 hours, depending upon the extent to which it is desired to raise the melting point of the rosin.

With such reaction periods as required to produce a substantial increase in melting point, it is preferable to keep the temperature of the reaction mixture below 35° C., since temperatures above 35° C. tend to reduce the refining action secured. A temperature within the range of about 5° C. to about 35° C. is preferred.

The amount of boron trifluoride added to the rosin solution will depend on the extent to which it is desired to raise the melting point of the rosin, along with the refining of the rosin, and will vary from about 0.1% to about 30% by weight of the rosin treated. In any case, sufficient boron trifluoride will be added to the rosin to produce the desired increase in the melting point of the rosin. The amount of water added to remove the boron trifluoride from the rosin solution after the precipitated color bodies have been filtered out will depend on the amount of the boron trifluoride originally present. When operating by a batch process, it is usually desirable to add one portion of water, say, for example, 2500 cc. of water per 600 grams of rosin in solution; admix it thoroughly with the rosin solution, separate it for the recovery of the dissolved boron trifluoride, and then wash the rosin solution with several successive proportions of water, to remove the last traces of boron and fluorine.

The precipitate which is filtered out of the rosin solution at the end of the polymerization reaction contains the visible and latent color bodies of rosin, in the form of a complex with boron trifluoride. A dark colored polymerized rosin can be recovered from this precipitate by dissolving it in a water-immiscible solvent in which it is soluble, washing the solution with water to decompose the boron trifluoride complex and to remove the last traces of the boron trifluoride from the rosin solution, and, finally, evaporating the solvent to recover the rosin.

The rosin treated to produce simultaneous refining and polymerization by treatment with boron trifluoride may be any rosin which contains visible and/or latent color bodies. Thus, for example, unrefined wood rosin or the lower grades of gum rosin, heat treated rosin, isomerized rosin, etc. may be advantageously treated in accordance with this invention. Any solvent for rosin which is inert in the reaction, and a non-solvent for the boron trifluoride-rosin color body complex, may be used in this method. Suitable solvents are, hydrogenated naphtha; hydrogenated naphthalene; suitable cuts of petroleum hydrocarbons, such as petroleum ether; etc. The concentration of rosin in the solution may vary over a wide range. Thus, concentrations within the range of 5%-50% will be found suitable.

The solvent used to recover the dark colored polymerized rosin must be a solvent for the boron trifluoride-color body complex. Suitable solvents are, for example, aliphatic ethers, such as ethyl ether and isopropyl ethers; halogenated hydrocarbons, such as chlorobenzene; esters; etc.

The boron trifluoride for use in this process may be secured from any source. It may be conveniently prepared by reaction of 2 parts by weight fluorspar and 1 part boric anhydride with 3 to 4 parts concentrated sulfuric acid. The gaseous boron trifluoride evolved from this reaction can be cooled by passing it through a suitable water cooled condenser, and, then, any impurities removed by passage through suitable absorption towers. Thus, hydrogen fluoride may be substantially removed by passage of the gas through an absorption tower packed with sodium fluoride, and the silicon fluoride may be substantially removed by passing the gas through fused boric anhydride.

The boron trifluoride used in this method may be replaced by its molecular compounds with aliphatic ethers, for example, ethyl ether; with aliphatic acids, for example, acetic acid; with phenols, for example, hydroxy benzene; with aliphatic alcohols, for example, ethyl alcohol, etc. However, such molecular compounds are less active than boron trifluoride alone, and for this reason I prefer to use the latter.

As a specific example of a treatment for the simultaneous refining and polymerization, in accordance with the method of my invention, a solution of 415 grams of I wood rosin in 846 grams of V. M. & P. naphtha was treated with about 30 grams of boron trifluoride during a period of ¾ of an hour, using vigorous agitation.

The temperature rose from 22° C. to 34° C. After the boron trifluoride treatment, the gasoline solution was decanted from the precipitate, thoroughly washed with successive proportions of hot and cold water, and the refined polymerized rosin recovered by evaporating the solvent from the rosin solution, using a final bath temperature of 200° C. A yield of approximately 77% of a refined polymerized rosin was produced. The precipitate was extracted in ether and the extract thoroughly washed and the solvent evaporated. A yield of approximately 20% of a dark colored polymerized rosin was obtained. The properties of the refined, polymerized rosin, the dark colored polymerized rosin and the original rosin were as follows:

|  | I wood rosin (untreated) | Refined polymerized rosin | Dark polymerized rosin |
|---|---|---|---|
| Melting point (drop method) | 80° C. | 98° C. | 106° C. |
| Acid number | 163 | 168 | 149 |
| (SCN)₂ value | 85 | 78 | 68 |
| Color (Lovibond color scale) | (I grade) | 16 amber (about X grade) | 80 amber +98 red (D+ grade) |

It will be readily understood that no particular form of apparatus is required for carrying out the process in accordance with my invention, and that particular quantities, temperatures or periods of treating are not of the essence of my invention, but that I broadly contemplate forming, by the interaction of a boron compound such as boric anhydride, sodium tetraborate, boric acid, boron triacetate, boron trifluoride, etc. and the color bodies contained in the rosin, a material insoluble in rosin solvents, and the subsequent removal of this insoluble material by any suitable means such as filtration of a solution of the treated rosin in a rosin solvent, decantation, etc.

The purified rosin produced in accordance with this invention will be found to grade lighter in color than rosin not so treated and will produce a soap which does not discolor to as great an extent as the soap produced from untreated rosin. For special uses, however, where a highly purified rosin is desired, it will be found advantageous to subject rosin purified as described above to a subsequent refining action.

I have found that the combination two-step refining treatment involving a preliminary treatment with a boron compound as described above, and a subsequent treatment by any of the well known processes of refining rosin, such as, for example, treatment with a selective solvent for color bodies as furfural, phenol, liquid SO₂, etc., treatment with adsorbents as activated carbon, silica gel, etc., treatment with alkylamines followed by regeneration of the rosin, treatment with alcoholic oxalic acid solution, or treatment by distillation in vacuum or in an inert atmosphere, will, contrary to expectation, give a refining action considerably greater than that which would be expected from the mere additive effects of each treatment singly. That is, I have found that there is a definite interrelation between the refining action using a boron compound and other refining actions, such as are obtained by the treatments outlined above, which results in producing a refined rosin superior in quality to any heretofore produced.

Processes for the refining of rosin with a selective solvent are described in, among others, United States Patents No. 1,715,084, No. 1,715,085 and No. 1,715,088 to Kaiser and Hancock, and No. 1,715,083, No. 1,715,086, No. 1,800,834 and No. 1,890,086 to Humphrey. Processes involving purification of rosin by distillation under various conditions are described in, among others, United States Patents No. 1,832,864 to Humphrey and No. 1,820,298 to Butts.

If the complete refining treatment involves pre-treatment with a suitable boron compound as described above, and subsequent treatment of the rosin in solution, it will obviously not be necessary to evaporate the rosin solution obtained after decantation or filtration from the insoluble matter resulting from treatment with a boron compound, but the rosin solution immediately after filtration or decantation may be treated with any desired refining agent in accordance with, for example, the processes using selective solvents described in the patents mentioned above. If the subsequent refining treatment involves distillation, the purified rosin obtained after treatment with a boron compound will be placed in any suitable apparatus for distillation in accordance, for example, with any of the processes involving distillation disclosed in the patents cited above.

In some cases it may be found desirable to wash the rosin solution after removal of insoluble reaction products several times with water before subjecting the rosin to further refining treatment as described above.

As illustrative of my invention involving treatment with a boron compound alone, 200 grams of FF wood rosin and 1 gram of boric acid are heated for 15 minutes at about 150° C. in at atmosphere of carbon dioxide. The material, after cooling, is then dissolved in gasoline to make a solution of about 14% concentration, the solution filtered, and the gasoline evaporated to obtain a purified rosin grading F.

As further illustrative of my invention involving the use of a two-step or composite refining process, 300 grams of the filtered gasoline solution of rosin described in the example above may be washed once with 30 grams of furfural, and four times with 7 grams of furfural for each wash. The gasoline solution after separation from the furfural may be evaporated to obtain a purified rosin grading H in a yield of 84%. A soap made from this purified rosin will after aging for eight days be lighter in color than a soap made from an M grade of wood rosin obtained by other refining methods.

As further illustrative of my invention involving two-step procedure, 200 grams of FF wood rosin and 4 grams of boric acid are heated for fifteen minutes at about 200° C. in an atmosphere of carbon dioxide. The material after cooling is dissolved in gasoline to give to it a concentration of about 14%. After permitting the insoluble matter to settle, the solution is decanted, and 300 grams of the solution are washed once with 30 grams of 85% phenol and four times with 7 grams each of 85% phenol. A 69% yield of a purified rosin grading H is obtained. A soap made from this rosin after aging twenty-nine days is comparable in appearance with a soap made from an I grade of wood rosin refined by treatment with, for example, furfural.

Further by way of example, 200 grams of FF wood rosin are heated for about ten minutes with 0.5 g. boric acid at about 150° C. in an atmosphere of carbon dioxide. The treated rosin is then dissolved to 14% concentration in gasoline and filtered from the insoluble matter formed in the reaction with boric acid. Three 200 g. portions of the filtered gasoline solution are washed countercurrently with three 15 g. portions of furfural, followed by six 10 g. portions of fresh furfural. Upon removal of the gasoline refined rosins were obtained as follows:

| Lot | Yield | Color |
|---|---|---|
| 1 | 70% | K— |
| 2 | 73.5 | M+ |
| 3 | 76.6 | I |

Soaps manufactured from these refined rosins are lighter in color, even after aging, than soaps made from an M wood rosin refined by other methods, and are superior to soaps made from N gum rosin.

As further illustrative of my invention involving a two-step process of refining, 500 grams of the gasoline solution of rosin referred to in the second example above are, after decantation, evaporated for the recovery of rosin therefrom, and this rosin distilled under reduced pressure in any suitable form of apparatus. There will be obtained a rosin grading X+ in color, and a soap produced from this rosin will, after aging for twenty-nine days, be extraordinarily light in color with no perceptible band and directly comparable to soap made from an I grade of gum rosin.

As further illustrative of the two-step process in accordance with this invention, 500 grams of a gasoline solution of rosin which has been treated as described above with a suitable boron compound are contacted with about 2–5% based on the rosin content of the solution of activated carbon, silica gel, or fuller's earth for a period of from 1–8 hours. Upon evaporation of the solution following this treatment a rosin grading I or better will be obtained.

The rosin produced by the process involving my invention will be superior to rosin obtained by any other refining process for, while other processes may produce a rosin having the same color grade as rosin produced by my process, it will be found that the soaps produced from rosin when refined in accordance with my invention will be lighter in color and will not darken so much on aging as will soaps produced from rosins of the same color grade refined by another process, and will have all the characteristics of a soap made from gum rosin. It will be understood that broadly my invention involves a treatment of rosin with a suitable boron compound such as boric anhydride, sodium tetraborate, boric acid, boron trifluoride, etc., followed, after removal of the insoluble reaction products, when a very high grade of rosin is desired, by any one of the other well known processes for refining rosin, as, for example, distillation, treatment with a selective solvent, various other refining treatments referred to above, etc. It is to be noted, however, that usually my refining treatment with a boron compound cannot be used with equal advantages subsequently to a refining treatment by distillation or with a selective solvent. It appears that the treatment with a boron compound in accordance with my invention in some manner operates to greatly increase the effectiveness of subsequent refining operations.

It will be understood that the details and examples hereinbefore set forth are illustrative only, and that the invention as herein broadly described and claimed is in no way limited thereby.

This application is a continuation in part of my application for United States Patent, Serial No. 704,133, filed Dec. 27, 1933 (now United States Patent No. 2,081,890).

What I claim and desire to protect by Letters Patent is:

1. A method for the simultaneous refining and polmerization of rosin which includes treating rosin in solution in a solvent therefor which is a non-solvent for the rosin color-body-boron trifluoride complex, with boron trifluoride at a temperature below 50° C. for the period of time required at the temperature used to obtain simultaneous refining and polymerization, removing the insoluble material formed by said treatment from the solution and recovering refined, polymerized rosin from said solution.

2. A method for the simultaneous refining and polymerization of rosin which includes treating rosin in solution in a solvent therefor which is a non-solvent for the rosin color-body-boron trifluoride complex, with boron trifluoride at a temperature within the range of about 5° C. to about 35° C. for the period of time required at the temperature used to obtain simultaneous refining and polymerization, removing the insoluble material formed by said treatment from the solution and recovering refined, polymerized rosin from said solution.

3. A method for the simultaneous refining and polymerization of rosin which includes treating rosin in solution in a solvent therefor which is a non-solvent for the rosin color-body-boron trifluoride complex, with boron trifluoride at a temperature within the range of about 5° C. to about 35° C. for a period of time within the range of from about 1 minute to about 24 hours, removing the insoluble material formed by said treatment from the solution and recovering refined, polymerized rosin from said solution.

4. A method for the simultaneous refining and polymerization of rosin which includes treating rosin in solution in a solvent therefor which is a non-solvent for the rosin color-body-boron trifluoride complex with boron trifluoride at a temperature within the range of about 5° C. to about 35° C. for a period of time within the range of from about 1 minute to about 24 hours, removing the insoluble material formed by said treatment from the solution, washing the solution with water and recovering refined, polymerized rosin from said solution.

5. A method for simultaneously refining and polymerizing rosin which includes treating rosin in solution in a solvent therefor which is a non-solvent for the rosin color-body-boron trifluoride complex, with boron trifluoride at a temperature not exceeding about 50° C. and for a period of time adapted to produce simultaneous refining and polymerization of the rosin; removing the insoluble material formed by said treatment from the solution; recovering refined, polymerized rosin therefrom; dissolving the insoluble material separated from the rosin solution in a water-immiscible solvent therefor; washing the solution formed thereby with water and recovering a dark colored, polymerized rosin therefrom.

6. A method for simultaneously refining and polymerizing rosin which includes treating rosin in solution in a solvent therefor which is a non-solvent for the rosin color-body-boron trifluoride complex, with boron trifluoride at a temperature below 50° C. for the period of time required at the temperature used to obtain simultaneous refining and polymerization; removing insoluble material formed by said treatment from the solution; recovering refined, polymerized rosin therefrom; dissolving the insoluble material separated from the rosin solution in a water-immiscible solvent therefor; washing the solution formed thereby with water and recovering a dark colored, polymerized rosin therefrom.

7. A method for simultaneously refining and polymerizing rosin which includes treating rosin in solution in a solvent therefor which is a non-solvent for the rosin color-body-boron trifluoride complex, with boron trifluoride at a temperature within the range of about 5° C. to about 35° C. for the period of time required at the temperature used to obtain simultaneous refining and polymerization; removing insoluble material formed by said treatment from the solution; recovering refined, polymerized rosin therefrom; dissolving the insoluble material separated from the rosin solution in a water-immiscible solvent therefor; washing the solution formed thereby with water and recovering a dark colored, polymerized rosin therefrom.

8. A method for simultaneously refining and polymerizing rosin which includes treating rosin in solution in a solvent therefor which is a non-solvent for the rosin color-body-boron trifluoride complex, with boron trifluoride at a temperature within the range of about 5° C. to about 35° C. for a period of time within the range of from about 1 minute to about 24 hours; removing insoluble material formed by said treatment from the solution; recovering refined, polymerized rosin therefrom; dissolving the insoluble material separated from the rosin solution in a water-immiscible solvent therefor; washing the solution formed thereby with water and recovering a dark colored, polymerized rosin therefrom.

9. A method for simultaneously refining and polymerizing rosin which includes treating rosin in solution in a solvent therefor which is a non-solvent for the rosin color-body-boron trifluoride complex, with boron trifluoride at a temperature within the range of about 5° C. to about 35° C. for a period of time within the range of from about 1 minute to about 24 hours; removing insoluble material formed by said treatment from the solution; washing the solution with water; recovering refined, polymerized rosin therefrom; dissolving the insoluble material separated from the rosin solution in a water-immiscible solvent therefor; washing the solution formed thereby with water and recovering a dark colored, polymerized rosin therefrom.

10. A method for the simultaneous refining and polymerization of rosin which includes treating rosin containing color bodies with a boron compound selected from the group consisting of boron trifluoride at a temperature not exceeding about 50° C. and for a period of time adapted to produce simultaneous refining and polymerization of the rosin and molecular compounds of boron trifluoride, the rosin being in solution in a solvent therefor which is a non-solvent for the reaction product of the rosin color bodies and the said boron compound, removing the insoluble material formed by said treatment from the solution and recovering refined, polymerized rosin from said solution.

11. A method for the simultaneous refining and polymerization of rosin which includes treating rosin containing color bodies with a boron compound selected from the group consisting of boron trifluoride and molecular compounds of boron trifluoride at a temperature not exceeding about 50° C. and for a period of time adapted to produce simultaneous refining and polymerization of the rosin, the rosin being in solution in a petroleum hydrocarbon solvent, removing the insoluble material formed by said treatment from the solution and recovering refined polymerized rosin from said solution.

12. A method for the simultaneous refining and polymerization of rosin which includes treating rosin in solution in a petroleum hydrocarbon solvent, with boron trifluoride at a temperature within the range of about 5° C. to about 35° C. for a period of time within the range of about 1 minute to about 24 hours, removing the insoluble material formed by said treatment from said solution and recovering refined, polymerized rosin from said solution.

JOSEPH N. BORGLIN.